United States Patent [19]

Miyata et al.

[11] 4,154,718

[45] May 15, 1979

[54] FIRE-RETARDANT THERMOPLASTIC RESIN COMPOSITION

[75] Inventors: Shigeo Miyata; Takesi Imahasi; Hitosi Anabuki, all of Takamatsu, Japan

[73] Assignee: Kyowa Chemical Industry Co. Ltd., Tokyo, Japan

[21] Appl. No.: 828,723

[22] Filed: Aug. 29, 1977

[30] Foreign Application Priority Data

Sep. 2, 1976 [JP] Japan ................................ 51/10424

[51] Int. Cl.[2] .......................... C08K 3/10; C08K 3/20; C08K 3/22; C08K 3/24

[52] U.S. Cl. .............................. 260/42.14; 260/42.49; 260/45.7 R; 260/45.75 R; 260/45.75 E; 260/47.75 D

[58] Field of Search ...................... 260/42.49, 45.75 E, 260/47.75 D, 45.7 R, 45.75 R, 42.14; 423/430; 428/921

[56] References Cited

U.S. PATENT DOCUMENTS

| | | | |
|---|---|---|---|
| 3,239,482 | 3/1966 | Rapp | 260/45.75 E |
| 3,488,725 | 1/1970 | Sherr et al. | 260/45.75 E |
| 3,829,400 | 8/1974 | Kato et al. | 260/45.75 D |
| 3,846,372 | 11/1974 | Mitchell | 260/45.75 R |
| 3,879,523 | 4/1975 | Miyata et al. | 423/430 |
| 3,912,671 | 10/1975 | Kondo et al. | 260/42.49 |
| 3,962,177 | 6/1976 | Dickens | 260/45.7 R |
| 3,996,142 | 12/1976 | White et al. | 260/2.5 FP |
| 3,998,783 | 12/1976 | Whelan | 260/45.75 N |
| 4,002,597 | 1/1977 | Dickens | 260/45.75 N |
| 4,085,088 | 4/1978 | Miyata et al. | 260/45.7 R |

OTHER PUBLICATIONS

Handbook of Chemistry and Physics—40th Edition, Chemical Rubber Pub. Co., (1959), pp. 1746 and 1747.

*Primary Examiner*—V. P. Hoke

*Attorney, Agent, or Firm*—Sherman & Shalloway

[57] ABSTRACT

A fire-retardant thermoplastic resin composition consisting essentially of:

(A) a thermoplastic synthetic resin, (B) about 40 to 150 parts by weight, preferably about 70 to 120 parts by weight, per 100 parts by weight of the thermoplastic synthetic resin, of at least one magnesium-containing inorganic compound selected from the group consisting of magnesium hydroxide, basic magnesium carbonate hydrate and hydrotalicites, and (C) a fire-retardant assistant selected from the group consisting of (1) about 0.1 to 30 parts by weight, per 100 parts by weight of the magnesium-containing inorganic compound, of an alkali metal chloride, (2) about 0.2 to 5% by weight, calculated as metal per 100 parts by weight of the magnesium-containing inorganic compound, of an inorganic tin compound, and (3) a combination of the alkali metal chloride (1) with about 0.2 to 5% by weight, calculated as metal per 100 parts by weight of the magnesium-containing inorganic compound, of an inorganic tin compound and/or an inorganic vanadium compound.

16 Claims, No Drawings

FIRE-RETARDANT THERMOPLASTIC RESIN COMPOSITION

This invention relates to a fire-retardant thermoplastic resin composition having superior fire retardancy without an appreciable deterioration in the properties of the thermoplastic resin, the fire retardancy being imparted by a synergistic effect of (1) a magnesium-containing inorganic fire retardant which when incorporated in the thermoplastic resin in an amount sufficient to impart satisfactory fire retardancy, will cause an unnegligible deterioration in the properties of the resin such as impact strength and (2) a fire-retardant assistant selected from the group consisting of alkali metal chlorides, inorganic tin compounds and mixtures of the alkali metal chlorides with inorganic tin compounds and/or inorganic vanadium compounds.

More specifically, the present invention relates to a fire-retardant thermoplastic resin composition consisting essentially of:

(A) a thermoplastic synthetic resin, (B) about 40 to 150 parts by weight, preferably about 70 to 120 parts by weight, per 100 parts by weight of the thermoplastic synthetic resin, of at least one magnesium-containing inorganic compound selected from the group consisting of magnesium hydroxide, basic magnesium carbonate hydrate and hydrotalcites, and (C) a fire-retardant assistant selected from the group consisting of (1) about 0.1 to 30 parts by weight, per 100 parts by weight of the magnesium-containing inorganic compound, of an alkali metal chloride, (2) about 0.2 to 5% by weight, calculated as metal per 100 parts by weight of the magnesium-containing inorganic compound, of an inorganic tin compound, and (3) a combination of the alkali metal chloride (1) with about 0.2 to 5% by weight, calculated as metal per 100 parts by weight of the magnesium-containing inorganic compound, of an inorganic tin compound and/or an inorganic vanadium compound.

It is known that the magnesium-containing inorganic compound (B) described above exhibits an effect of an inorganic fire retardant for thermoplastic synthetic resins. It is also known that if it is desired to impart high fire retardancy rated UL94 V-0 or V-1 by the incorporation of such an inorganic fire retardant, it is necessary to use a considerably great amount of the inorganic fire retardant, and consequently, the desirable mechanical properties, such as impact strength, of the thermoplastic synthetic resins are deteriorated to an unnegligible degree, and the molding suitability of the resins is also reduced.

The present inventors made investigations in order to overcome such disadvantages. These investigations led to the discovery that the conjoint use of the fire retardant assistant (C) with a reduced amount of the inorganic fire retardant (B) can impart superior fire retardancy to thermoplastic synthetic resins, and that since the amount of the fire retardant assistant (C) can be small, high fire retardancy can be imparted to the thermoplastic resins without substantially giving an adverse effect to the properties of the thermoplastic resins.

When antimony oxide and an organic halogen compound is added to a thermoplastic synthetic resin or an ABS resin and a vinyl chloride resin are blended or their constituent ingredients are copolymerized with it in order to impart fire retardancy, troubles occur because of the toxicity of the additive compounds or because large quantities of toxic and corrosive gases are generated at the time of combustion. However, the inorganic fire retardant (B) is free from such a trouble, and the fire retardant assistant (C) is non-toxic and very cheap.

It is not entirely clear why such a superior result can be obtained by the conjoint use of the magnesium-containing inorganic compound (B) and a small amount of the fire retardant assistant (C). It has been found however that when the magnesium-containing inorganic fire retardant (B) is incorporated in an amount which can improve the fire retardancy of a thermoplastic synthetic resin to an extent rated HB by UL94 standards or outside the standards, together with several percent to about 30 percent, an unexpected synergistic effect can be achieved in that the fire retardancy of the thermoplastic resin can be increased to UL94 V-0. It has also been found quite unexpectedly that the reduction of the flow characteristics of the resin during molding which is caused by the incorporation of the inorganic fire retardant (B) can be prevented, and superior molding suitability can be achieved. Further, according to the present invention, no additive is required which will generate toxic gases or large quantities of smoke during molding or burning, and the safety of the fire retarding agent is ensured.

It is an object of this invention to provide a fire retardant thermoplastic resin composition which has overcome the disadvantage of the deterioration of moldability and other properties caused by the use of the magnesium-containing fire retardant, and can attain superior fire retardancy by the use of a decreased amount of the fire retardant.

The above and other objects and advantages of the invention will become apparent from the following description.

Magnesium-containing inorganic compounds selected from magnesium hydroxide, basic magnesium carbonates hydrate and hydrotalcites used as (B) in the composition of this invention can be used either singly or in a combination of two or more. Preferred magnesium-containing inorganic compounds are those having a specific surface area, determined by the BET method, of not more than about 20 $m^2/g$ and hardly undergo aggregation of particles, for example, those having a particle size of about 0.1 to 5 microns are used preferably. For example, suitable magnesium-containing inorganic compounds are those having a specific surface area, determined by the BET method, of about 1 to 20 $m^2/g$, preferably about 1 to 15 $m^2/g$. Suitable hydrotalcites are those of the formula $Mg_{1-x}Al_x(OH)_2.(CO_3)_{x/2}.mH_2O$ wherein $0.1<x<0.4$ and $0<m<1$.

The amount of the magnesium-containing inorganic compound is about 40 to 150 parts by weight, preferably about 70 to 120 parts by weight, per 100 parts by weight of the thermoplastic resin. If the amount of the Mg-containing inorganic compound is less than the lower limit specified, it is difficult to impart a sufficiently high fire-retarding effect, and if it exceeds the upper limit specified above, an unnegligible deterioration in properties is likely to occur. Hence, the amounts within the above-specified range are recommended.

In the composition of this invention, a sufficiently high fire retarding effect can be imparted by the use of the reduced amount of the inorganic compound (B) if a small amount of the fire retardant assistant (C) is used together. Hence, fire retarding effects rated UL94 V-0 can be obtained by using the magnesium-containing inorganic compound (B) in an amount of not more than 100 parts by weight per 100 parts by weight of the resin. Thus, the likelihood of the deterioration of the properties of the resin composition can be advantageously avoided, and high fire-retarding effects can be imparted by incorporating non-toxic additives. It was quite unexpected that superior fire retarding effects can be obtained by jointly adding small amount of the fire retarding assistant (C) even when the amount of the magnesium-containing inorganic fire retardant is decreased to an extent which will not likely to deteriorate the properties of the resin composition. This is a significant advance in the fire retarding techniques.

The achievement of the above improved effect by the composition of this invention was quite unexpected in view of the fact that the fire-retardant assistant (C) used together with the known magnesium-containing inorganic compound (B) does not show any utilizable fire retarding effect if incorporated alone in the above-mentioned amounts in thermoplastic synthetic resins, and frequently it reduces the fire retardancy of the thermoplastic synthetic resins.

As the alkali metal chloride (1) of the fire retarding assistant (C), potassium chloride and sodium chloride are preferred. The alkali metal chlorides may be used singly or in a combination of two or more. Desirably, the alkali metal chloride (1) is used in powder form, and more preferably it is used as a fine powder having an average particle diameter of not more than about 1 micron. The amount of the alkali metal chloride (1) is as small as about 0.1 to about 30 parts by weight per 100 parts by weight of the magnesium-containing inorganic compound (B). Preferably, the amount is about 0.1 to 20 parts by weight, more preferably about 1 to 10 parts by weight. If the amount of this metal compound is less than the specified lower limit, it is difficult to achieve the intended result, and if it is larger than the specified amount, no further increase in improvement can be expected, but rather the effect would be reduced. The amounts within the above range are therefore recommended.

Suitable inorganic tin compounds (2) of the fire retardant assistant (C) are for example, alkali metal stannates such as sodium stannate and potassium stannate, metastannic acid, stannous oxide, stannic oxide, stannous chloride, stannic chloride, stannous sulfate, stannic sulfate, and stannous iodide. Suitable inorganic vanadium compound (3) of the fire retardant assistant (C) include, for example, alkali metal vanadates such as sodium vanadate and potassium vanadate, ammonium vanadate, vanadium oxides such as vanadium pentoxide, vanadium chlorides such as vanadium trichloride, an other inorganic vanadium compounds such as vanadyl sulfate.

Preferably, these inorganic tin compound and inorganic vanadium compound are used as fine powders having an average particle size of not more than about 1 micron. The amounts of these compounds are as small as about 0.2 to about 5% by weight calculated as metal based on the magnesium-containing inorganic compound (B). When a combination of about 0.1 to about 30 parts by weight of an alkali metal chloride and about 0.2 to 5% by weight as metal of a combination of an inorganic tin compound and/or an inorganic vanadium compound, per 100 parts by weight of the magnesium-containing inorganic compound, is used, the synergistic effect of the combination with the ingredient (B) can be suitably obtained by adjusting the ratio of the alkali metal chloride/the inorganic tin compound and/or the inorganic vanadium compound calculated as metal to 1/about 0.02 to about 0.5 by weight.

The use of the above combination frequently gives more improved fire retardancy than in the case of using the inorganic compound (B) with only the alkali metal chloride (1). The use of the alkali metal chloride with the tin compound and/or vanadium compound makes it possible to reduce the amount of the magnesium-containing inorganic compound (B) further, and to impart satisfactory fire retardancy to thermoplastic synthetic resins.

The presence of the fire retardant assistant (C) dispersed near the surface of the particles of the magnesium-containing inorganic compound (B) serves to achieve an especially superior synergistic effect. In order to achieve such dispersion, it is preferred to utilize the inorganic compound (B) and the fire retarding assistance (C) in a premixed state. Such pre-mixing can be performed by uniformly mixing powders of the magnesium-containing inorganic compound (B) and the fire retardant assistant (C) in a water or alcohol medium or under sufficient stirring, and if desired, dehydrating and drying the mixture. Preferably, the premix is melt-kneaded with the thermoplastic resin. If the inorganic vanadium compound is used, it is preferred to perform the premixing in an aqueous solution containing alkali such as sodium hydroxide or potassium hydroxide.

In the present invention, it is also possible to surface-treat the particles of the magnesium-containing inorganic compound (B) with an anionic surface-active agent before or after premixing with the fire retardant assistant (C), and this frequently gives favorable results. The preferred amount of the anionic surface-active agent used for surface treatment is about 1 to 10% by weight based on the weight of the magnesium-containing inorganic compound (B). For example, the powder of the magnesium-containing inorganic compound (B) before or after premixing is added to an aqueous solution of an anionic surface-active agent such as sodium stearate with sufficient stirring; or conversely, an aqueous solution of sodium stearate is added to a suspension of the powder of the magnesium-containing inorganic compound to cause chemical adsorption of the anionic surface-active agent to the solid powder of the inorganic compound (B). The surface treatment improves the dispersibility of the inorganic compound (B) and hence its flowability, and is effective therefore for the improvement of workability and mechanical strength characteristics such as impact strength.

Examples of usable anionic surface-active agents are alkali metal salts of higher fatty acids having the formula RCOOM wherein R represents an alkyl group containing 3 to 40 carbon atoms and M represents an alkali metal atom; alkyl sulfates of the formula RO-$SO_3M$ wherein R and M are as defined above; alkylsulfonates of the formula $RSO_3M$ wherein R and M are as defined above, alkylarylsulfonates of the formula R-aryl-$SO_3M$ wherein R and M are as defined above, and sulfosuccinate ester salts of the formula

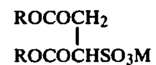

wherein R and M are as defined above.

Specific examples of the surfactants include sodium stearate, potassium stearate, sodium oleate, potassium oleate, sodium palmitate, potassium palmitate, sodium laurate, potassium laurate, potassium behenate, sodium laurylbenzenesulfonate, potassium octadecylsulfate sodium laurylsulfonate, and disodium.2-sulfoethyl.α-sulfostearate.

Suitable thermoplastic synthetic resins for use in the present invention include, for example, polymers or copolymers of α-olefins such as ethylene, propylene and butene-1; copolymers of at least one such α-olefin with conjugated or non-conjugated dienes; ABS resins such as polystyrene or styrene copolymers; polyesters or copolyesters, polycarbonate resins; synthetic rubbers; and mixtures of these. The present invention is especially suitable for improving the fire retardancy of resins which have little or no polarity.

There is no particular restriction on the method of blending these thermoplastic synthetic resins with the aforesaid magnesium-containing inorganic compound (B) and fire retardant assistant (C), and any desired means capable of uniformly mixing these additives with the resin can be used. For example, the mixing can be performed at a temperature below the point at which the heat deterioration of the resin occurs, using extrusion mixing or roll mixing. The fabrication can be performed by injection molding, extrusion molding, blow molding etc.

The thermoplastic resin composition of this invention may further contain conventional additives. Examples of the additives include fillers such as asbestos, glass fibers, talc, mica, calcium silicate, aluminum silicate and calcium carbonate; coloring agents such as carbon black, phthalocyanine, quinacridone, indoline, azoic pigments, titanium oxide, cadmium pigments, yellow lead, and red iron oxide; antioxidants such as di-t-butyl p-cresol, distearyl thiodipropionate and dilauryl thiodipropionate; lubricants such as calcium stearate, zinc stearate, butyl stearate and ethylenebis-stearamide; and ultraviolet absorbers such as 2-hydroxy-4-octoxybenzophenone, 2(2'-hydroxy-5-methylphenyl)benzotriazole and ethyl-2-cyano-3,3-diphenyl acrylate. The amounts of the other additives can be suitable selected. For example, the amounts are about 10 to about 100 parts by weight for the fillers, about 0.1 to about 10 parts by weight for the coloring agents, about 0.1 to about 10 parts by weight for the antioxidants, about 0.1 to about 5 parts by weight for the lubricants and about 0.1 to about 10 parts by weight for the ultraviolet absorbers, per 100 parts by weight of the thermoplastic resin.

The following examples illustrate the present invention in more detail.

EXAMPLE 1 TO 4 AMD COMPARATIVE EXAMPLES 1 AND 2

Two kilograms of magnesium hydroxide having a specific surface area, determined by the BET method, of 10 $m^2/g$ was added to 20 liters of an aqueous solution at about 50° C. containing 40 g of sodium oleate, an anionic surfactant. The mixture was thoroughly stirred for about 30 minutes thereby to cause the chemical adsorption of oleic acid to the surface of the magnesium hydroxide. The magnesium hydroxide was then filtered, washed with water, and dried. The dried product was mixed with potassium chloride which had been pulverized and screened to a size of 200 mesh (under) in an amount shown in Table 1. They were fully mixed by a Henschel mixer. The mixture in the amounts shown in Table 1 calculated as $Mg(OH)_2$ was mixed with 100 parts by weight of polypropylene, and the mixture was melt-kneaded and shaped. A burning test and an Izod impact strength test on the shaped articles were performed and the results are shown in Table 1.

For comparison, magnesium hydroxide treated in the same way as above except that the use of potassium chloride was omitted was used in an amount of about 103 parts by weight (Comparative Example 1) which was substantially equal to the total amount of magnesium hydroxide and potassium chloride in Example 1, and 150 parts by weight (Comparative Example 2) which was the conventional amount, calculated as $Mg(OH)_2$, and mixed with 100 parts by weight of polypropylene. The results are shown also in Table 1. The results of a control in which no fire retardant was added are also shown in Table 1.

Table 1

| Example (Ex.) or Comparative Example (CE.) | Amount of fire retardant (parts by weight as $Mg(OH)_2$ per 100 parts by weight of the resins) | Amount of KCl (% by weight based on $Mg(OH)_2$) | Burning test UL94 VE (⅛ inch) | Izod impact strength (notched) by JIS K7110 ($kg.cm/cm^2$) |
|---|---|---|---|---|
| Ex. 1 | 100 | 3 | V-O | 4.2 |
| Control | — | — | Outside the standards | 1.9 |
| CE. 1 | 103 | — | HB | 4.0 |
| CE. 2 | 150 | — | V-1 to V-O | 1.0 |
| Ex. 2 | 80 | 4 | V-O | 4.6 |
| Ex. 3 | 70 | 8.0 | V-1 | 4.9 |
| Ex. 4 | 60 | 20 | V-1 | 4.9 |

EXAMPLE 5 AND COMPARATIVE EXAMPLE 3

To about 10 liters of ethyl alcohol were added with through stirring 2 kg of hydrotalcite $Mg_{0.7}Al_{0.3}(OH)_2(CO_3)_{0.15}\cdot 0.55\ H_2O$ having a specific surface area, determined by the BET method, of 15 $m^2/g$ and 80 g of a powder of sodium chloride which had been pulverized and screened to a size of 300 mesh (under). They were sufficiently mixed for about 30 minutes. The mixture was filtered, and dried.

The dried product in the amounts indicated in Table 2 was mixed with high-density polyethylene. The resulting compositions were subjected to the same burning test as shown in Table 1. The results are shown in Table 2.

for comparison, the above procedure was repeated except that the use of sodium chloride was omitted (Comparative Example 3). The above procedure was also repeated without adding the fire retardant. The results are shown also in Table 2.

EXAMPLE 6 AND COMPARATIVE EXAMPLE 4

Sodium stearate (60 g) was added to 20 liters of water at about 80° C. With sufficient stirring, the sodium stearate was completely dissolved. Basic magnesium carbonate hydrate (2 kg) having a specific surface area, determined by the BET method, of 12 $m^2/g$ was added to the solution. The mixture was vigorously stirred for about 30 minutes to cause the chemical adsorption of stearic acid to the surface of the basic magnesium carbonate. The surface-treated product was filtered, washed with warm water at about 80° C., and then dried. The dried products and potassium chloride (300 mesh under) were added in the amounts indicated in Table 2 with high-density polyethylene. The results are shown in Table 2.

For comparison, the above procedure was repeated except that the use of potassium chloride was omitted (Comparative Example 4). The results are also shown in Table 2.

EXAMPLE 7 AND COMPARATIVE EXAMPLE 5

The same procedure as in Example 6 was repeated except that magnesium hydroxide having a specific surface area, determined by the BET method, of 11 $m^2/g$ was used in the amount shown instead of the basic magnesium carbonate hydrate, and polystyrene was used instead of the high-density polyethylene. The results are shown in Table 2.

For comparison, the above procedure was repeated except that the use of potassium chloride was omitted (Comparative Example 5). The results are also shown in Table 2.

EXAMPLE 8 AND COMPARATIVE EXAMPLE 6

The procedure of Example 7 was repeated expect that an ethylene/propylene copolymer was used instead of the polystyrene in the about indicated in Table 2 (Comparative Example 6). The results are also shown in Table 2. The results of a control in which no fire retardant was added are also shown in Table 2.

Table 2

| Example (Ex.) or Comparative Example (CE.) | Type of resin | Type and amount of fire retardant (parts by weight per 100 parts by weight of the resin) | Type and amount of alkali metal chloride (wt. % based on the inorganic fire retardant) | Burning test UL94 VE (⅛ inch) |
|---|---|---|---|---|
| Ex. 5 | High-density polyethylene | $Mg_{0.7}Al_{0.3}(OH)(CO_3)_{0.15} \cdot 0.55\ H_2O$ [110] | NaCl [4] | V-O |
| CE. 3 | " | " [115] | — | HB |
| Control | " | — | — | Outside the standards |
| Ex. 6 | " | Basic magnesium carbonate hydrate [95] | KCl [2] | V-O |
| CE. 4 | " | " [97] | — | Outside the standards |
| Ex. 7 | Polystyrene | $Mg(OH)_2$ [80] | KCl [3] | V-O |
| CE. 5 | " | " [82] | — | Outside the standards |
| Control | " | — | — | Outside the standards |
| Ex. 8 | Ethylene/propylene copolymer | $Mg(OH)_2$ [80] | KCl [4] | V-O |
| CE. 6 | " | " [83] | — | Outside the standards |
| Control | " | — | — | Outside the standards |

EXAMPLE 9 AND COMPARATIVE EXAMPLE 7

Magnesium hydroxide (2 kg) having a specific surface area, determined by the BET method, of 8 $m^2/g$ was suspended in about 20 liters of water, and the suspension was stirred fully. Then, 33.7 g (corresponding to 0.75% as metal based on the magnesium hydroxide) of sodium stannate [$Na_2Sn(OH)_6$] was added to the suspension. The mixture was fully stirred for about 30 minutes. Then, the temperature of the mixture was raised to about 75° C., and 60 g of sodium stearate was added. The mixture was well stirred for about 30 minutes. It was filtered, and the solid product was dried. The dried product and potassium chloride (300 mesh under) were mixed in the amounts indicated in Table 3 with polypropylene. The mixture was melt-kneaded, and shaped. The results are shown in Table 3.

For comparison, the above procedure was repeated except that the use of sodium stannate and potassium chloride was omitted (Comparative Example 7). The above procedure was also repeated except that the fire retardant was not added (Control). The results are also shown in Table 3.

EXAMPLES 10 AND 11 AND COMPARATIVE EXAMPLES 8 AND 9

Magnesium hydroxide having a specific surface area, determined by the BET method, of 15 $m^2/g$ whose surface had been treated and which had been dried in the same way as in Example 9, was mixed with polypropylene, potassium chloride (300 mesh under) and vanadium pentoxide having a size of about 1 micron or carbon black having a size of about 1 micron in the amounts indicated in Table 3. The mixture was melt-kneaded, and shaped. The results are shown in Table 3.

For comparison, the above procedure was repeated except that the use of potassium chloride and vanadium pentoxide or carbon black was omitted (Comparative Examples 8 and 9). The above procedure was also repeated except that no fire retardant was added (Control). The results are also shown in table 3.

Table 3

| Example (Ex.) and Comparative Example (CE.) | Amount of $Mg(OH)_2$ (parts by weight per 100 parts by weight of the resin | Types and amounts of the fire retardant assistant (% by weight per 100 parts by weight of $Mg(OH)_2$) | Burning test UL94 VE (⅛ inch) |
|---|---|---|---|
| Ex. 9 | 70 | KCl [4]<br>$Na_2Sn(OH)_6$ [0.75]<br>(as metal) | V-O |
| CE. 7 | 75 | — | Outside the standards |
| Control | — | — | Outside the standards |
| Ex. 10 | 55 | KCl [30]<br>$V_2O_5$ [2]<br>(as metal) | V-O |
| CE. 8 | 74 | — | Outside the standards |
| Ex. 11 | 75 | KCl [4]<br>Carbon black [2] | V-O |
| CE. 9 | 81 | — | Outside the standards |
| Control | — | — | Outside the standards |

EXAMPLE 12

Sodium stannate (5.6 g=2.5 g as tin) was dissolved in 5 liters of water, and the solution was stirred. Then, 500 g of magnesium hydroxide having a specific surface area, determined by the BET method, of 11 $m^2/g$ was added, and the mixture was stirred for about 30 minutes. The magnesium hydroxide was washed with water, filtered, and dried at about 150° C. for 10 hours. It was found that in the dried product, almost 100% of tin was bonded to magnesium hydroxide. The proportion of the sodium stannate as tin metal was 0.5% by weight per 100 parts by weight of the magnesium hydroxide. The dried product (480 g) was mixed with 500 g of polypropylene having a melt index of 4.5, and the mixture was sufficiently kneaded at about 220° C. using an extruder. The melt-kneaded mixture was pelletized, and molded into a thickness of about 3 mm at about 240° C. Test pieces were prepared from the molded product, and the various properties were measured. The results are shown in Table 4.

EXAMPLE 13

Stanic oxide in an amount of 31.5 g, 0.3 g, and 3.13 g respectively (corresponding to 25 g, 5 g and 2.5 g calculated as tin) was suspended in 5 liters of water, and the suspension was sufficiently stirred. Then, 500 g of magnesium hydroxide having a specific surface area, determined by the BET method, of 8 $m^2/g$ was put into the suspension, and the mixture was stirred at room temperature for about 30 minutes to mix them uniformly. The temperature of the mixture was then raised to about 80° C., and 1 liter of a solution containing 20 g of sodium stearate at about 80° C. was added. The mixture was sufficiently stirred, followed by filtration, washing with water, and drying. The treated products contained 5, 1, and 0.5% by weight respectively of stannic oxide calculated as tin per 100 parts by weight of the magnesium hydroxide. The treated product (460 g) was mixed with 500 g of polypropylene having a melt index of 4.5, and processed in the same way as in Example 12. The results are shown in Table 4.

EXAMPLE 14

Basic magnesium carbonate (500 g) having a specific surface area, determined by the BET method, of 15 $m^2/g$ was suspended in 5 liters of water, and the suspension was fully stirred. To the stirred suspension was added 2 g of stannic chloride (1.25 g as tin), and the mixture was maintained for about 30 minutes, followed by filtration, washing with water, and drying. The content of stannic chloride calculated as metallic tin was 0.25% by weight per 100 parts by weight of the basic magnesium carbonate hydrate. The treated product (480 g) was sufficiently kneaded with 500 g of polyethylene having a melt index of 0.3 at about 200° C. in an extruder. The mixture was extruded at about 210° C. to form a sheet having a thickness of about 3 mm.

The results are shown in Table 4.

EXAMPLE 15

500 g of a hydrotalcite analogue, $Mg_{0.67}Al_{0.33}(OH)_2(CO_3)_{0.165}.0.5H_2O$, having a specific surface area, determined by the BET method, of 12 $m^2/g$ was suspended in 5 liters of water, and the suspension was stirred sufficiently. To the stirred suspension were added 4 g, as tin, of a fine powder of metastannic acid and 10 g of sodium oleate and maintained for about 30 minutes, followed by filtration, washing with water, and drying. The content of metastannic acid calculated as tin metal was 0.8% based on the hydrotalcite analogue.

The treated product (450 g) was mixed with 500 g of polyethylene having a melt index of 0.3, and shaped into a plate in the same way as in Example 14. The results are shown in Table 4.

Table 4

| Example | Resin | Amount of Mg-containing compound (parts by weight) (*1) | Tin content (wt.%) (*2) | Burning test UL94 VE (1/8 inch) | Izod impact strength (notched) |
|---|---|---|---|---|---|
| 12 | Polypropylene | 96 | 0.5 | V-O | 3.4 |
| 13 | " | 92 | 5.0 | V-1 | — |
| " | " | " | 1.0 | V-1 | — |
| " | " | " | 0.5 | V-O | 4.6 |
| 14 | Polyethylene | 96 | 0.25 | V-1 | 18.9 |
| 15 | " | 90 | 0.8 | V-O | 29.6 |
| Control | Polypropynele | 0 | 0 | Completely burnt (outside) the standards) | 1.9 |
| Control | Polyethylene | 0 | 0 | " | 15.0 |

Note
(*1) Parts by weight per 100 parts by weight of the resin.
(*2) Percent by weight of the tin compound calculated as Sn per 100 parts by weight of the magnesium-containing inorganic compound.

EXAMPLE 16

Sodium stannate (4.5 g; 2 g as Sn) was dissolved in 5 liters of water, and with sufficient stirring, 500 g of magnesium hydroxide having a specific surface area, determined by the BET method, of 13 $m^2/g$ was added and maintained for about 30 minutes. Then, the temperature of the mixture was raised to about 80° C., and 1 liter of an aqueous solution containing 20 g of sodium stearate at about 80° C. was added to the mixture and maintained for about 1 hour, followed by washing with water, filration, and drying. The content of the tin compound calculated as Sn based on the magnesium hydroxide was 0.4% by weight, and the content of stearic acid was 3% by weight on the same basis.

The treated product was mixed in an amount of 85, 90, 92, and 100 parts by weight respectively with 100 parts by weight of polypropylene having a melt index of 4.5, and the mixture was shaped and tested in the same way as in Example 12. The results are shown in Table 5.

COMPARATIVE EXAMPLE 10

The same magnesium hydroxide as used in Example 16 was treated with sodium stearate in the same way as in Example 16 except that sodium stannate was not used. The treated magnesium hydroxide was melt-kneaded with the same polypropylene as used in Example 16 so that the amount of the magnesium hydroxide became 108, 117, 127, 138, and 150 parts by weight per 100 parts by weight of the resin. The mixtures were each shaped, and tested. The results are shown in Table 5.

Table 5

| Amount of magnesium hydroxide (parts by weight) | | 85 | 90 | 92 | 100 | 108 | 117 | 127 | 138 | 150 |
|---|---|---|---|---|---|---|---|---|---|---|
| Example 16 | Burning | V-1 | V-1 | V-0 | V-0 | | | | | |

Table 5-continued

| | | Amount of magnesium hydroxide (parts by weight) | | | | | | | | |
|---|---|---|---|---|---|---|---|---|---|---|
| | | 85 | 90 | 92 | 100 | 108 | 117 | 127 | 138 | 150 |
| | test: UL94 VE (⅛ inch) | | | | | | | | | |
| | Izod impact strength (notched) | 4.2 | 4.1 | 4.6 | 3.5 | | | | | |
| Compparative Example 10 | Burning test: UL94 VE (⅛ inch) | | | | | Outside the standards | HB | HB | V-1 | V-1 or V-0 |
| | Izod impact strength (notched) | | | | | 2.4 | 1.3 | 1.1 | 0.9 | 0.7 |

The results given in Table 5 show that in Comparative Example 10, in order to obtain an equivalent degree of fire retardancy to Example 16, a drastic decrease in impact strength is inevitable.

What is claimed is:

1. A fire-retardant thermoplastic resin composition consisting essentially of:
   (A) a thermoplastic synthetic resin,
   (B) about 40 to 150 parts by weight per 100 parts by weight of the thermoplastic synthetic resin, of at least one magnesium-containing inorganic compound selected from the group consisting of magnesium hydroxide, basic magnesium carbonate hydrate and hydrotalcite, and
   (C) a fire-retardant assistant selected from the group consisting of (1) about 0.1 to 30 parts by weight, per 100 parts by weight of the magnesium-containing inorganic compound, of an alkali metal chloride, (2) about 0.2 to 5% by weight, calculated as metal per 100 parts by weight of the magnesium-containing inorganic compound, of an inorganic tin compound and (3) a combination of the alkali metal chloride (1) with about 0.2 to 5% by weight, calculated as metal per 100 parts by weight of the magnesium-containing inorganic compond, of an inorganic tin compound or an inorganic vanadium compound or both.

2. The composition of claim 1 which further contains about 10 to 100 parts by weight of a filler, about 0.1 to 10 parts by weight of an antioxidant, about 0.1 to about 5 parts by weight of a lubricant and about 0.1 to about 10 parts by weight of an ultraviolet absorber, per 100 parts by weight of the thermoplastic synthetic resin (A).

3. The composition of claim 1 wherein the magnesium-containing inorganic compound (B) is surface-treated with about 1 to 10% by weight, based on the weight of the magnesium-containing inorganic compound, of an anionic surface active agent.

4. The composition of claim 1 wherein the alkali metal chloride is selected from a chloride of an alkali metal selected from K and Na.

5. The composition of claim 1 wherein the inorganic tin compound in (2) or (3) of (C) is a compound selected from the group consisting of sodium stannate, potassium stannate, metastannic acid, stannous oxide, stannic oxide, stannous chloride, stannic chloride, stannous sulfate, stannic sulfate and stannous iodide.

6. The composition of claim 1 wherein the inorganic vanadium compound (3) is a compound selected from the group consisting of sodium vanadate, potassium vanadate, ammonium vanadate, vanadium pentoxide, vanadium trichloride, and vanadyl sulfate.

7. The composition of claim 1 which comprises about 70 to 120 parts by weight, per 100 parts by weight, of the thermoplastic synthetic resin of at least one magnesium-containing inorganic compound.

8. The composition of claim 1 wherein the magnesium-containing inorganic compound is magnesium hydroxide.

9. The composition of claim 1 wherein the magnesium-containing inorganic compound is basic magnesium carbonate hydrate.

10. The composition of claim 1 wherein the magnesium-containing inorganic compound is hydrotalcite.

11. The composition of claim 1 wherein the fire-retardant assistant is the alkali metal chloride (C) (1).

12. The composition of claim 1 wherein the fire-retardant assistant is the inorganic tin compound (C) (2).

13. The fire-retardant composition of claim 1 wherein the fire-retardant assistant is the combination of the alkali metal chloride with at least one of an inorganic tin compound and an inorganic vanadium compound (C) (3).

14. The composition of claim 13 wherein the fire-retardant assistant is a combination of the alkali metal chloride with an inorganic vanadium compound.

15. The composition of claim 1 wherein the thermoplastic synthetic resin is selected from the group consisting of homopolymers or copolymers of alpha-olefins, acrylonitrile butadiene-styrene resins, polyesters, polycarbonate resins, and synthetic rubbers or mixtures thereof.

16. The composition of claim 15 wherein the fire-retardant assistant is a combination of an alkali metal chloride with about 0.2 to 5% by weight, calculated as metal per 100 parts by weight of the magnesium-containing inorganic compound, of an inorganic vanadium compound or mixture of an inorganic vanadium compound and an inorganic tin compound.

* * * * *

UNITED STATES PATENT AND TRADEMARK OFFICE

CERTIFICATE OF CORRECTION

PATENT NO. : 4,154,718
DATED : May 15, 1979
INVENTOR(S) : Miyata, et al.

It is certified that error appears in the above-identified patent and that said Letters Patent are hereby corrected as shown below:

Under item [30] insert -- Japanese Application No. 52-94100 - Filed August 8, 1977 --

Signed and Sealed this

*Thirty-first* Day of *July 1979*

[SEAL]

*Attest:*

LUTRELLE F. PARKER

*Attesting Officer* *Acting Commissioner of Patents and Trademarks*